United States Patent [19]

Braun

[11] E Re. 29,568

[45] Reissued Mar. 7, 1978

[54] CARTON SEALING APPARATUS

[75] Inventor: Eric A. Braun, Springfield, Mo.

[73] Assignee: Ex-Cell-O Corporation, Troy, Mich.

[21] Appl. No.: 769,251

[22] Filed: Feb. 16, 1977

Related U.S. Patent Documents

Reissue of:

[64] Patent No.: 3,912,576
Issued: Oct. 14, 1975
Appl. No.: 516,949
Filed: Oct. 22, 1974

[51] Int. Cl.[2] ..... B31B 31/00; E04B 2/00

[52] U.S. Cl. ..... 156/580.2; 53/375; 93/DIG. 1

[58] Field of Search ..... 156/73.1, 380, 580.1, 156/580.2, 581; 93/DIG. 1, 44.1 R; 53/375, 379

[56] References Cited

U.S. PATENT DOCUMENTS

| | | | |
|---|---|---|---|
| 2,837,983 | 6/1958 | Kovac | 93/44.1 R |
| 3,196,068 | 7/1965 | Schoder et al. | 156/581 |
| 3,422,730 | 1/1969 | Mitzelfelt et al. | 93/44.1 R |
| 3,468,731 | 9/1969 | Obeda | 156/581 |
| 3,700,529 | 10/1972 | Monaghan | 156/580.2 |
| 3,787,257 | 1/1974 | Akerlund | 156/580 |

*Primary Examiner*—Douglas J. Drummond
*Attorney, Agent, or Firm*—Reising, Ethington, Barnard, Perry & Brooks

[57] ABSTRACT

Carton sealing apparatus for sealing a rectangular end closure of a thermoplastic coated paperboard carton by ultrasonic vibrations. The apparatus includes an anvil, or backup member, and an ultrasonic vibrating tool. The mandrel is received in the carton with the end closure to be sealed folded against the smooth end surface thereof. The ultrasonic vibrating tool engages the end closure on the opposite side thereof from the mandrel, and, when energized, generates heat sufficient to cause the thermoplastic coating of the paperboard to flow and weld the layers of the end closure together. Ribs project from the end surface of the vibrating tool to provide a sealing pattern of "bow-tie" configuration, the ribs having various heights with respect to the end surface of the vibrating tool to accommodate changes in the number of layers of paperboard at the different areas on the end closure.

10 Claims, 5 Drawing Figures

CARTON SEALING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to carton sealing apparatus, and is particularly concerned with apparatus for sealing an end closure of a thermoplastic coated paperboard carton by ultrasonic vibration.

2. Description of the Prior Art

The prior art includes various apparatus for sealing containers of thermoplastic material both by the direct application of heat, and by the generation of heat by ultrasonic vibration. Examples of prior art apparatus of this type are disclosed in U.S. Pat. Nos. 3,200,557; 3,307,325; 3,309,841; 3,468,731; 3,531,908; 3,562,041; 3,579,958; 3,681,167 and 3,717,539, as well as German Auslegeschrift 2,165,620.

SUMMARY OF THE INVENTION

In accordance with the present invention, an ultrasonic vibrating tool for engaging the end closure of the carton to be sealed is provided with a ribbed formation projecting from the end surface of the tool. The ribbed formation includes a pair of oppositely disposed, concentric sets of triangular enclosures with the apices disposed in opposed relationship with each other such that the ribs defining the sides of the opposed triangular enclosures extend in opposite directions from each other from the respective apices. The bases of each of the triangular enclosures are defined along the sides of the rectangular end closure. The apices of the triangular enclosures are located along a center line bisecting opposite sides of the rectangular end closure. The rib formations are relieved at various locations to provide for variations in the number of layers, and hence the thickness, of the end closure.

DESCRIPTION OF THE PREFERRED EMBODIMENT

Figure 1:
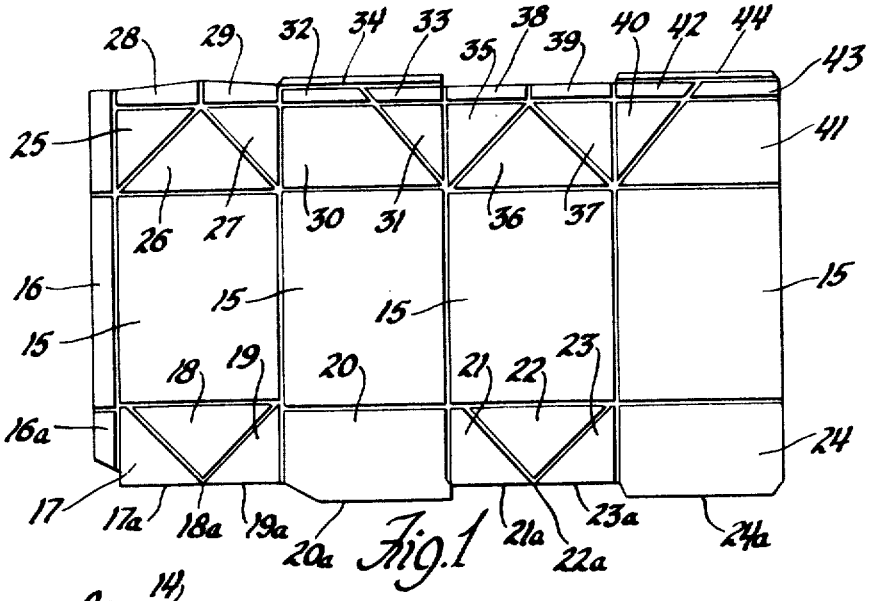
FIG. 1 is a plan view of a conventional thermoplastic coated paperboard blank for use in forming a container of the type having an end closure to be sealed by the apparatus of this invention.

FIG. 1 represents a blank of thermoplastic coated paperboard for forming a carbon having a tubular body of rectangular cross-section with end closures at opposite ends of the tubular body. The blank is divided into a plurality of panels which are adapted to form the walls and the end closure members of the carton or container. The panels are formed by scored lines, and the body portion of the container is formed by four side panels 15, which panels are secured together by heat sealing or otherwise bonding a side seam flap 16 to the edge portion 15A of the panel 15 located at the opposite end of the blank from the side seam flap 16.

Figure 2:
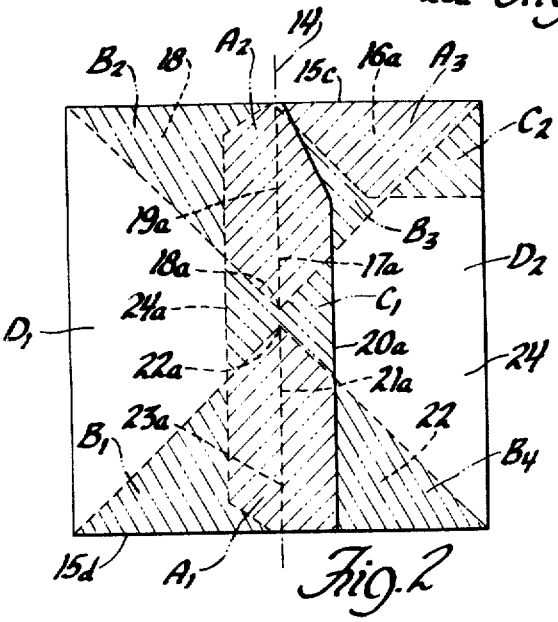
FIG. 2 is a bottom plan view of a carton erected from the blank of FIG. 1.

The bottom end closure of the container is formed from the various rectangular and triangular panels 17, 18, 19, 20, 21, 22, 23 and 24. When the carton is folded along the score lines between the side panels 15, and the side seam flap 16 is welded to the inner surface of the end panel 15, the triangular panels 18 and 22 are folded inwardly with the panels 17 and 19 overlying the panel 18, and the panels 21 and 23 overlying the panel 22. Triangular folds of double thickness, or having the thickness of two layers of the carton material, are provided. The triangular fold formed by panels 17, 18 and 19 has an apex 18a (FIG. 2), with the edges 17a and 19a of panels 17 and 19, respectively, disposed in abutting relationship and overlying the panel 18 as illustrated in FIG. 2. Similarly, an oppositely extending triangular fold is provided by panels 21, 22 and 23 having an apex 22a, with the outer edges 21a and 23a of panels 21 and 23, respectively, disposed in abutting relationship and overlying the panel 22 as shown in FIG. 2.

When the triangular panels 18 and 22 are folded inwardly to their positions illustrated in FIG. 2, the edge 24a of panel 24 is inserted beneath the edge 20a of panel 20, the edges 20 and 24a overlapping each other and being located on opposite sides of the apices 18a and 22a of the triangular folds. The apices 18a and 22a are thus located on a center line 14 defined by the abutting edges 17a, 19a, 21a, and 23a, which center line bisects the opposite sides 15c and 15d of the end closure as shown in FIG. 2.

The lower end 16a of the side sealing strip 16 in FIG. 1 is sealed against the inner surface of the panel 24 as shown in FIG. 2.

The top end closure of the container is formed by the various rectangular and triangular panels formed at the opposite ends of the side panels 15 from the bottom end closure panels 17–24. The top end closure of the container made from the blank shown in FIG. 1 is of the same construction as the top end closure of the container disclosed in the co-pending application Ser. No. 420,427 of Egleston et al, filed Nov. 30, 1973. The top end closure of the container is formed with a pair of roof panel members which are inclined upwardly in the completed position and between which are disposed the inner triangular panels 26 and 36. One of the roof panel members is formed from the panels 30 and 31, and the other of the roof panel members is formed from the panels 40 and 41. A pair of triangular fold-back panels 25 and 27 are disposed on opposite sides of the inner triangular panel 26, and similarly, a pair of triangular fold-back panels 35 and 37 are disposed on opposite sides of the inner triangular panel 36. When the top end panel is completed in the manner shown in the above referred to co-pending application, the inner triangular panel 36 and the adjacent fold-back panels 35 and 37 function as an extensible pouring spout. Panels 25, 26 and 27 are provided on the upper ends thereof with inner rib panels 28 and 29. The inner closure panels 35, 36 and 37 are provided with inner rib panels 38 and 39 on the upper ends thereof. The outer closure panels 30, 31, 40 and 41 are provided on the upper ends thereof with outer rib panels 32, 33, 42 and 43, respectively.

Panels 32 and 33 are provided with an upwardly extending sealing panel 34, while the outer rib panels 42 and 43 are provided with an upwardly extending sealing panel 44. As is disclosed in detail in the above referred to co-pending application Ser. No. 420,427, the top end closure is formed by sealing and welding the opposed surfaces of the sealing panels 34 and 44 together as well as the opposed surfaces of the panels 28, 29, 32 and 43 by heating the thermoplastic coating on the opposed surfaces to cause the coatings of the panels to flow together so that the panels will be welded together upon cooling of the thermoplastic material.

Areas of different thickness, i.e., of different numbers of layers, are indicated by shading in FIG. 2. The shaded areas A1, A2 and A3 in FIG. 2 have four layers of material. Areas B1, B2, B3 and B4 are three layers thick, while areas C1 and C2 are two layers thick. The unshaded areas D1 and D2 are single layer areas.

Figure 3:
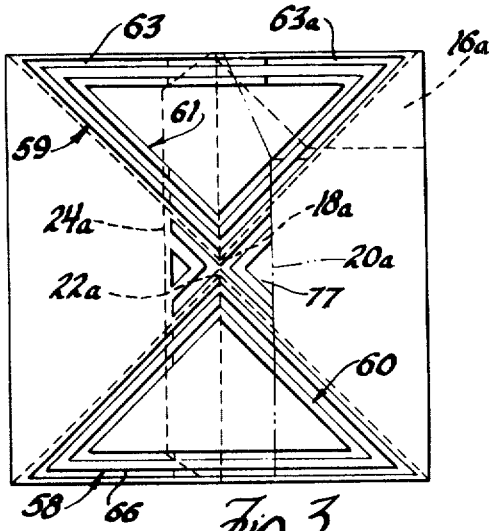
FIG. 3 is a view taken approximately along lines 3—3 of FIG. 5 illustrating the ultrasonic vibrating tool according to the present invention superimposed on the end closure of FIG. 2 for a sealing operation.
Figure 4:
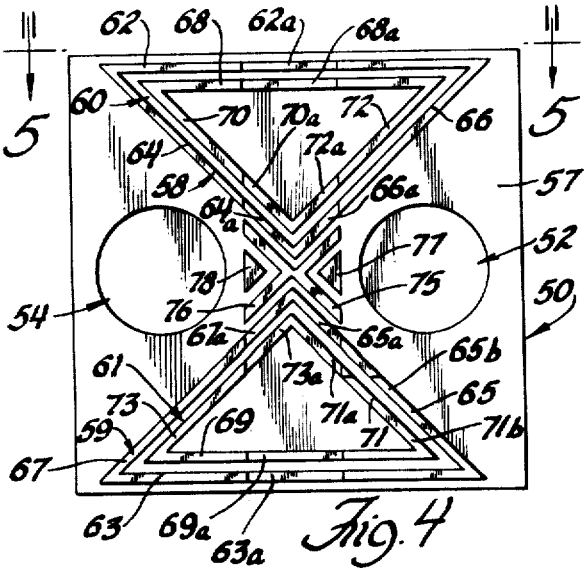
FIG. 4 is a plan view of the end of an ultrasonic vibrating tool according to the present invention.
Figure 5:
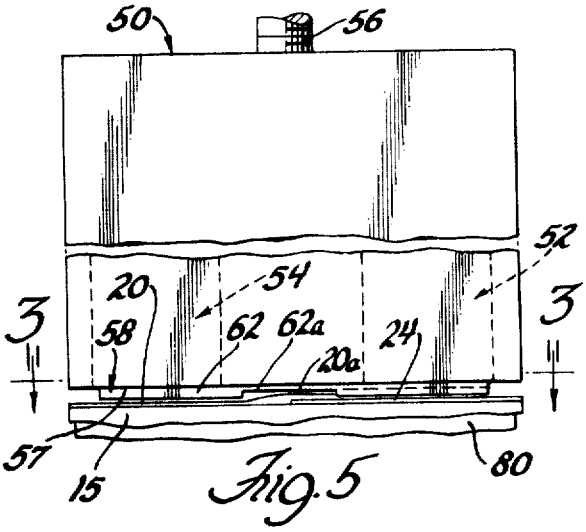
FIG. 5 is an elevational view along lines 5—5 of FIG. 4 illustrating a sealing operation with the apparatus of the invention.

With reference to FIGS. 3, 4 and 5, the vibrating tool is indicated collectively by reference numeral 50 and comprises an elongated body of rectangular cross-section having lengthwise openings 52 and 54 formed therein for tuning the body to obtain the desired vibrational frequency. As shown in FIG. 5, the upper end of the body is provided with a threaded attachment member 56. The vibrating tool or horn 50 is formed with an end face 57, and a ribbed formation projects from the end surface 57 of the tool for engaging the end closure of the container and sealing the end closure along a path determined by the configuration of the ribbed formation by sonically welding the layers of the end closure together.

The rib formation includes two sets of concentric, triangular enclosures. One set includes an outer triangular enclosure 58 and an inner triangular enclosure 60. The other set includes an outer triangular enclosure [62] *59* and an inner triangular enclosure [64.] *61*. The triangular enclosure set 58, 60 is disposed in opposed relationship with the triangular enclosure set [62,64] *59, 61* in that the two sets of concentric triangles extend in opposite directions from their apices with the apices disposed near the center of the end surface 57.

The triangular enclosure 58 has a base leg 62 and a pair of side legs 64 and 66. The side legs 64 and 66 extend from the apex of the triangular enclosure 58 to opposite ends of the base leg 62. The inner triangular enclosure 60 includes a base leg 68 and side legs 70 and 74. The outer triangular enclosure 59 includes a base leg 63 and a pair of side legs 65 and 67. The base leg 63 is disposed on the opposite side of the end portion 57 from the base leg 62 of the outer triangular enclosure 58. The inner triangular enclosure 61 includes a base leg 69, and side legs 71 and 73. *Thus, each set of concentric triangles 58, 60 and 59, 61 has one recessed surface portion between the inner and outer triangle legs and also has another recessed surface portion within the inner triangle of the set.*

Disposed between the opposed apices of the triangular sets, is a pair of oppositely disposed V-shaped ribs 75 and 76, the V-shaped ribs extending in opposite directions from the center of the end portion 57. A triangular projection 77 is located between the legs of the V-shaped rib 75, and a triangular projection 78 is located between the legs of the V-shaped rib 76. The apex of the V-shaped rib 75 is joined to the apex of the V-shaped rib 76 as shown in FIG. 4.

To accommodate the four-layer thickness of area A1 of the end closure of FIG. 2, the central portions 62a, 68a of the base legs 62 and 68, respectively, are reduced in height with respect to the end surface 57. Similarly, portions 64a and 66a of the side legs of the triangle 58 adjacent the apex are reduced in height to accommodate the four-layer thickness of area A1. Portions 70a and 72a of the side legs 70 and 72, respectively, are also reduced in height to accommodate the four-layer thickness of area A1.

The right hand portions 63a and 69a of the base legs 63 and 69, respectively, as well as the lower right hand portions 65b and 71b of side legs 65 and 71, respectively, are reduced in height to accommodate the four-layer thickness of areas A2 and A3 of FIG. 2. Similarly, portions 65a, 67a, 71a and 73a of the side legs 65, 67, 71 and 73, respectively, are reduced in height to accommodate the four-layer thickness of area A2 of FIG. 2.

The V-shaped ribs 75 and 76, as well as the triangular projections 77 and 78, have the same height with respect to the end surface 57 as the leg portions 62a, 68a, 64a, 66a, 70a, 72a, 65a, 67a, 71a, 73a, 63a, 69a, 65b and 71b.

When the container blank is erected and mounted on a mandrel 80 (FIG. 5), the panels 17–24 of the container blank are folded to form the end closure as shown at FIG. 2. The mandrel 80 in FIG. 5 has a smooth end surface, and engages the inner surfaces of the end closure. The vibrating horn 50 is brought into engagement with the outer surface of the end closure such that the ribbed formation on the end surface 57 thereof engages the end closure as illustrated in FIG. 3 (the section lines being omitted in FIG. 3 to avoid confusion). The vibrating horn or tool 50 is incorporated into an ultrasonic transducer of the type disclosed in U.S. Pat. No. 3,432,691 and 3,526,792 wherein electrical energy is converted into mechanical energy. The tool 50 converts the mechanical energy into vibrations at a desired frequency. When the ribbed formation projecting from the end surface 57 engages the outer surface of the end closure panels, the tool 50 is caused to vibrate at a frequency that, within a predetermined time, generates heat sufficient to cause the thermoplastic coatings in the areas engaged by the ribbed formations to flow. When the tool 50 is caused tp stop vibrating, the thermoplastic material cools and sets to weld the layers of material together along the pattern determined by the configuration of the ribbed formation. As shown in FIG. 3, the sealing pattern has a configuration that may be termed a bow tie configuration as determined by the two sets of opposed, concentric triangular rib enclosures together with the V-shaped ribs 75 and 76, as well as the triangular projections 77 and 78.

As an example, when the horn 50 is designed to vibrate at a frequency of 20,000 cycles per second, for each welding operation on the thermoplastic coated paperboard of the illustrated carton, a vibration of from about 0.1 to 0.5 seconds will be required to cause the thermoplastic material to flow. Following the vibration time of from 0.1 to 0.5 seconds, then horn 50 may be held in contact with the container end closure surface for a period of from about 0.5 to 1.5 seconds to allow the thermoplastic material to cool and set to complete the seal along the areas engaged by the ribbed formation of the horn 50. The foregoing specific figures regarding the vibrating frequency and time, as well as the setting time of the thermoplastic material, are given by way of example only.

As shown in FIG. 3, a seal is formed between the various layers of the end closure, which seal has the configuration of the ribbed formation projecting from the end surface 57 of the horn. The thermoplastic material is heated and welded wherever the horn engages the surface of the end closure, which is determined by the configuration of the ribbed formation projecting from the end surface 57 of the horn.

While a specific form of the invention has been illustrated in the accompanying drawing and described in the foregoing specification, it will be understood by those silled in the art that the invention is not limited to the exact construction shown. To the contrary, various alterations in the construction, all falling within the scope and spirit of the invention, will be apparent to those skilled in the art.

The embodiments of the invention in which an exclusive property or privilege is claimed are defined as follows:

1. A carton sealing vibrating tool for ultrasonically sealing an end closure of a thermoplastic coated paperboard carton comprising: a body having an end surface with a ribbed formation projecting therefrom, said ribbed formation including a pair of oppositely disposed sets of concentric triangular enclosures.

2. A carton sealing vibrating tool as claimed in claim 1 wherein said ribbed formation further includes a pair of oppositely disposed V-shaped ribs between the opposed apices of said triangular enclosures.

3. A carton sealing vibrating tool as claimed in claim 2 wherein said ribbed formation further includes a pair of triangular projections, one of which is located between the legs of one of said V-shaped ribs, and the other of which is located between the other of said V-shaped ribs.

4. A carton sealing vibrating tool as claimed in claim 3 wherein said triangular enclosures each have a base leg and a pair of side legs, and wherein said base legs and side legs have reduced height portions with respect to said end surface.

5. A carton sealing vibrating tool as claimed in claim 4 wherein said V-shaped ribs and triangular projections have the same height with respect to said end surface as said reduced height portions of said legs.

*6. A carton sealing vibrating tool for sealing an end closure of a thermoplastic coated paperboard carton, said tool comprising: a body having an end surface with a formation projecting therefrom, said projecting formation of the end surface including a pair of triangles arranged in an opposed relationship and having respective apices located adjacent each other so as to form a bow-tie configuration, and each projecting triangle having a recessed surface portion enclosed thereby such that there are at least two recessed surface portions located on opposite sides of the adjacent apices of the triangles.*

*7. A tool as claimed in claim 6 wherein the triangles of the projecting formation on the end surface have the apices thereof spaced from each other and the end surface including projecting portions extending between the triangles at the spaced apices of the triangles.*

*8. A tool as claimed in claim 7 wherein the body end surface projecting portions between the triangle apices comprise V-shaped ribs.*

*9. A tool as claimed in claim 6 wherein the body end surface has edges defining a rectangular shape thereof, and said triangles having respective legs extending along opposite edges of the end surface.*

*10. A carton sealing vibrating tool for sealing an end closure of a thermoplastic coated paperboard carton, said tool comprising: a body having an end surface including edges forming a rectangular shape, said body end surface including a formation projecting therefrom with a pair of triangles arranged in an opposed relationship, the triangles having respective legs extending along opposite edges of the end surface and also having legs extending inwardly from the legs along the opposite edges to define respective apices located adjacent each other at the center of the end surface so as to form a bow-tie configuration, and the body end surface having at least two recessed surface portions respectively located between the center of the end surface and the opposite edges thereof along which said triangle legs extend so as to be enclosed by the triangles.*

* * * * *